UNITED STATES PATENT OFFICE.

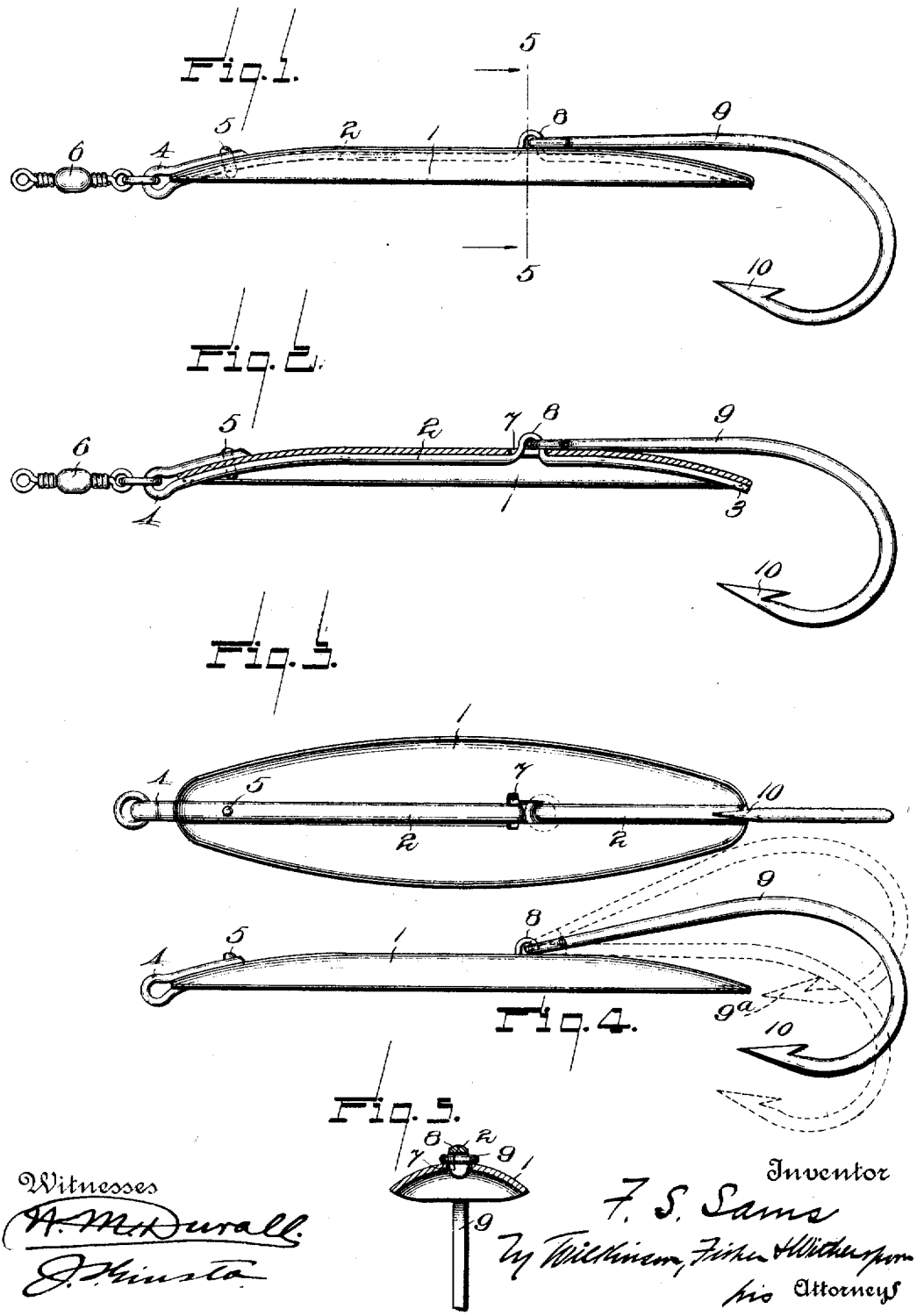

FRANK S. SAMS, OF NEW SMYRNA, FLORIDA.

TROLLING-SPOON.

No. 888,935.  Specification of Letters Patent.  Patented May 26, 1908.

Application filed January 18, 1908. Serial No. 411,510.

*To all whom it may concern:*

Be it known that I, FRANK S. SAMS, a citizen of the United States, residing at New Smyrna, in the county of Volusia and State of Florida, have invented certain new and useful Improvements in Trolling-Spoons; and I do hereby declare the following to be a full, clear, and exact description of the invention, such as will enable others skilled in the art to which it appertains to make and use the same.

This invention relates to improvements in trolling spoons, and while applicable for use in connection with all kinds of fish caught with spoons, it is primarily designed for tarpon and other large game fish.

In the spoons as ordinarily constructed, the spoon and cluster of hooks are so swiveled with relation to each other and the line that the spoon rapidly revolves as the same is trolled through the water.

In the present invention, however, one of the objects is to provide a spoon that, instead of revolving, will dart from side to side and having a hook so hung thereon that the rapidly moving hook will swish laterally, making the whole device appear as a fish moving rapidly through the water with its tail swishing from side to side.

Another object of the invention is to provide a strengthening rib for the concave spoon, and still a further and important object is the particular manner of securing the hook to the spoon, so that when a fish strikes and is hung, when the line is pulled taut the spoon and hook coöperate to prevent the fish from getting off.

While the invention is not restricted to the exact details shown and described, still for the purpose of disclosure, reference is had to the accompanying drawings illustrating a practical embodiment of the invention, in which like letters designate the same parts in the several views, and in which—

Figure 1 represents a view in side elevation of the improved spoon and manner of attaching the hook thereto. Fig. 2 is a central longitudinal sectional view through the spoon showing the reinforcing rib and the hook in side elevation. Fig. 3 is a bottom plan view. Fig. 4 is a side elevation showing different positions the hook will assume with relation to the spoon as it darts through the water, and Fig. 5 is a sectional view on the line 5—5 of Fig. 1, the barb of the hook being broken away.

1 designates the spoon proper, which may be of an elongated form and of concave conformation.

Extending longitudinally of this spoon and disposed substantially along the central inside or concave portion thereof is a strengthening or reinforcing rib 2, which may be secured to the spoon in any suitable way; for instance, the end 3 may be soldered or riveted to the spoon, while the other end is preferably bent back upon itself to engage the forward end of the spoon to form the loop 4, and the bent-over end being riveted to the body portion by a suitable rivet 5 passing through the bent-over end and through the spoon and through the body portion of the strengthening rib. Before this is done, the usual swivel 6 may be secured in the loop 4.

At a position between the central portion of the spoon and one of its ends, illustrated in the drawings toward its rear end, is an aperture 7. As shown in the drawings, this aperture 7 is disposed toward the rear end of the spoon at a substantial distance from the central portion thereof, and at this position the reinforcing rib 2 is provided with the bent portion 8 extending through the aperture 7 a substantial distance to form a loop for hanging the hook 9.

The hook 9, as shown, extends with the edge of the shank opposite the barb portion lying adjacent the convex side of the spoon, so that the hook or barb portion 10 is disposed toward the spoon, instead of away from it as is ordinarily the case.

This manner of hanging the hook allows the same to freely swing laterally and at the same time to move in directions substantially at right angles to its lateral movement, so that the end of the spoon is encompassed by the hook portion; that is to say, the radial distance from the pivotal point 8 to the point 10 of the hook is such as to allow clearance of the point past the rear end of the spoon, but it will cause the barb end of the hook when on the concave side of the spoon to lie inside of the end of the spoon. In consequence of this construction and arrangement of the concave spoon with the particular disposition of the hook, owing to the suspension of the hook at a position on the spoon intermediate of the center and one end of the spoon, as the device is trolled through the water, owing to this arrangement and the differences of pressure on the larger and smaller areas of the spoon from the pivotal point 8, the spoon, instead of revolving, will dart from side to side with the hook trailing behind in a swishing fashion causing the appearance of a rapidly swimming fish. Also, when a strike is made, it will be seen that the opposing forces of the taut line and the hooked fish will cause the hooked portion of the hook to rest substantially in the position shown in dotted lines at 9ª, Fig. 4, acting somewhat after the fashion of a snap-hook with the jaws of the fish imprisoned within the space between the curved portion of the hook and the end of the spoon, so that it is practically impossible for the fish to get off if the line is held taut, as every forward lunge would be impeded by the rear end of the spoon striking the fish's jaw.

Having thus described the invention, what I claim is:—

1. An elongated concave trolling spoon provided with a central longitudinal rib on one face, one end of said rib being projected beyond the end of the spoon and bent back upon itself and secured to said spoon to form a loop, and a hook secured to said spoon, substantially as described.

2. A trolling spoon provided with a reinforcing rib on one side thereof and bent to form a projecting loop extending through said spoon to the other side thereof, and a hook hung on said loop, substantially as described.

3. An elongated concave trolling spoon provided with an aperture and with a central longitudinal rib on its concave face, said rib being bent upon itself and upon said spoon at one end to form a swivel connection, and said rib being bent intermediate of its length to form a loop extending to the other side of said spoon through said aperture, and a hook hung to said loop, substantially as described.

4. A trolling spoon provided with a reinforcing rib on one side thereof, and having a loop portion extending through said spoon to the other side thereof at a position intermediate of said spoon's center and one end, and a hook hung to said loop, substantially as described.

5. A trolling spoon provided with a hook suspended therefrom on the longitudinal central line of the spoon with the edge of the shank, opposite the barb portion, lying adjacent one side of the spoon, the radial distance from the point of said hook to its position of suspension being just sufficient to allow clearance of the point of the hook beyond the end of the spoon, whereby opposing forces at the forward end of the spoon and said hook will cause the point of said hook to close in towards the rear end of the spoon and form an interlock with the jaw of a fish, substantially as described.

6. An elongated concave trolling spoon provided with a central longitudinal strengthening rib on its concave face having a looped portion extending through said spoon at a position intermediate of the center of the spoon and one end thereof, and a hook hung to said looped portion of said rib with the edge of the shank opposite the barb portion lying against the adjacent face of the spoon, and the radial distance from the point of the hook to its suspension position being just sufficient for clearance of the point of the hook past the rear end of the spoon, whereby said hook is normally free to move in varying directions with the hook portion substantially encompassing the rear end of the spoon, and whereby opposing forces at the forward end of the spoon and said hook will cause the point of said hook to close in towards the rear end of the spoon, substantially as described.

7. An elongated concave trolling spoon provided with an aperture intermediate of its center and rear end, a central reinforcing rib for the concave face of said spoon provided with a bent portion extending through said aperture, and at its forward end bent upon itself and said spoon and secured thereto to form a swivel loop and a hook suspended from said bent portion with the edge of its shank opposite its barb portion lying against the convex side of the spoon, the radial distance between the point of the hook and its position of suspension being slightly greater than the distance from said position of suspension to the rear end of the spoon, substantially as described and for the purposes set forth.

8. An elongated concave trolling spoon provided with a central longitudinal rib on its concave face, one end of said rib being projected beyond the end of the spoon and bent back upon itself and secured to said spoon to form a loop for the attachment of a line at the central forward end of the spoon, in combination with a hook suspended from said spoon at a position intermediate of the center and rear end of the spoon to swing laterally of and at right angles toward and away from said spoon, said hook being hung with the edge of its shank, opposite its barb portion, lying adjacent the convex side of said spoon, with the curved portion of said hook adapted to encompass the rear end of said spoon, whereby when the spoon is trolled through the water the pull of the line at the forward end of the spoon and the retarding swishing of the hook will impart a darting movement instead of a revolving movement to the spoon, substantially as described.

In testimony whereof, I affix my signature, in presence of two witnesses.

FRANK S. SAMS.

Witnesses:
W. E. POLLOCK,
JOHN F. HAMMILTON.